(12) United States Patent
Busch et al.

(10) Patent No.: US 6,257,603 B1
(45) Date of Patent: Jul. 10, 2001

(54) DRIVING STABILIZER FOR MOTOR VEHICLES

(75) Inventors: Werner Busch, Weinstadt; Jörg Rösener; Wolfgang Speier, both of Stuttgart; Thomas Szell, Waiblingen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/286,517

(22) Filed: Apr. 6, 1999

(30) Foreign Application Priority Data

Apr. 6, 1998 (DE) .............................. 198 15 313

(51) Int. Cl.$^7$ .................................. B60G 21/05
(52) U.S. Cl. ................. 280/124.106; 280/5.506; 280/5.507
(58) Field of Search .................... 280/5.506, 5.507, 280/5.508, 5.51, 5.511, 124.106, 124.107, 5.502; 92/136, 108

(56) References Cited

U.S. PATENT DOCUMENTS 3,197,233 * 7/1965 Van Winsen ................. 280/5.502
5,575,502 * 11/1996 Oppitz et al. ................. 280/689
5,632,502 * 5/1997 Oppitz et al. ................. 280/689

FOREIGN PATENT DOCUMENTS

| 43 37 813 | 5/1995 | (DE) . |
| 195 33 864 | 4/1997 | (DE) . |
| 0 428 439 | 5/1991 | (EP) . |
| 0 458 345 | 11/1991 | (EP) . |

* cited by examiner

Primary Examiner—Paul N. Dickson
Assistant Examiner—Faye M. Fleming
(74) Attorney, Agent, or Firm—Kenyon & Kenyon

(57) ABSTRACT

A driving stabilizer has a rotary actuator located between spider parts supporting stabilizer arms. Flanges associated with the spider parts and supported by the spider parts form end covers of the rotary actuator. A central part adjacent to the flanges includes an outer body formed by an annular jacket spanning a gap between the flanges and an inner body. The outer body and inner body are mutually rotatable and axially secured with respect to one another and each non-rotatably connected to a respective one of the spider parts via a respective one of the flanges.

18 Claims, 2 Drawing Sheets

DRIVING STABILIZER FOR MOTOR VEHICLES

FIELD OF THE INVENTION

The present invention relates to a driving stabilizer for motor vehicles.

RELATED TECHNOLOGY

Driving stabilizers with a rotary actuator located in the link of the spider parts, which support the stabilizer arms, are known from European Patent Application No. 0428439 A1. The spider parts are non-rotatably held in a form-fitting manner in receptacle bushings of the front end parts by a gearing, and the receptacle bushings are components of two housing halves of the rotary actuator, which axially overlap and are axially secured via a support, which includes the bearing collars and a swivel nut securing the bearing collars against each other and is provided on the outer periphery of the receptacle bushings so they can rotate in relation to one another. The two overlapping housing halves together delimit an inner space, into which a cog-like extension projects from a front face end of one support half. The diameter of this extension is smaller than the diameter of the inner space and it delimits an annular space, which extends to the outer diameter of the inner space. An annular piston with a piston bushing which follows the annular piston axially, overlaps the cog at its free end and is closed by a bottom part, is located in the annular space, so that the piston bushing has the annular piston at one end and the central piston surface at the other end; the annular piston and the central piston surface form the boundaries of working spaces with their sides facing away from one another. Such a rotary actuator has a relatively complicated design, has a relatively large length and its design requires the entire driving stabilizer to be removed for repair and assembly.

Swivel motors for driving stabilizers are also known (German Patent No. 195 33 864 C1) in which the outer body and the inner body delimit an annular space, which is subdivided into the working chambers by axial wings associated with the outer body and the inner body and is axially closed by covers. The covers are non-rotatably connected to the outer body and one of the covers is provided with a neck, into which a spider part of the driving stabilizer is axially inserted so that it is non-rotatably secured. The opposite cover is traversed by the other spider part of the driving stabilizer, which is associated with the inner body and engages in a central receptacle of the inner body and non-rotatably secured against it. Such a swivel motor is relatively short, yet its repair is associated with a relatively high cost, since there is considerable overlapping between the spider parts of the driving stabilizer and the swivel motor. Furthermore, such a design requires a considerable amount of sealing.

German Patent Application No. 43 37 813 A1 has the same basic construction. The driving stabilizer spider part associated with the outer body has a flange, which is welded to a cover in turn welded to the outer body. The flange of the opposite spider part of the driving stabilizer is bolted onto a flange, which is connected to the inner body of the swivel motor. With this design, there are fewer sealing problems due to the plurality of welds. However, the swivel motor represents a disposable unit barely accessible for repairs, which is connected to one of the spider parts of the driving stabilizer by welding.

SUMMARY OF THE INVENTION

It is an object of the present invention to provide a driving stabilizer with a respective rotary actuator resulting in a more compact design and improved conditions for assembly.

The present invention provides a drive stabilizer for motor vehicles having lateral, swivelable stabilizer arms and spider parts (2, 3) located in their transversal connections, which are connected via a rotary actuator (1) located between them, which is coaxial with the spider parts (2, 3) and includes mutually rotatable, adjusting elements (outer body 7, inner body 8), which are axially secured with respect to one another, and are non-rotatably connected to one of the spider parts (2, 3) via the respective end face part (flange 4, 5) of the rotary actuator (1), wherein the end parts (flange 4, 5) of the rotary actuator (1) are formed by the ends of the spider parts (2, 3) designed as connecting flanges (4, 5) and are adjacent to a central part (6) of the rotary actuator (1) as covers, this central part (6) including an annular jacket that forms the outer body (7) of the rotary actuator (1), spanning the gap between the covers (flange 4, 5).

According to the present invention the front end of the rotary actuator is formed by covers, which form at the same time connecting flanges for the spider parts and are supported by the spider parts as connecting flanges. Thus the rotary actuator becomes an insertable element with which the flanges are to be connected in the usual manner. The double function of the flanges as connecting parts and cover parts reduces the complexity and the required length. If the assembly unit located between the covers and forming a central part has an annular jacket as an outer body, which, as a spacer, forms the transition between the covers radially outward and thus forms the housing of the rotary actuator together with the covers, this also contributes to reducing the complexity of the design.

According to the present invention, the cover-building flanges are preferably permanently attached to the spider parts, which can be achieved by forging them together, but can also be preferably achieved by welding.

For the overall design of the rotary actuator, it has proven to be particularly advantageous if the outer body forms the axial and radial support for an inner body arranged coaxially, which is also non-rotatably attached to one cover. Thus a very compact axial length is achieved, where both covers can be basically connected in the same manner.

It is particularly convenient if the outer body and the inner body end faces are flush with one another.

If the outer body forms the support for the inner body as an annular jacket, it is particularly advantageous if the outer body has axially offset shoulders radially inside, against which the inner body is axially supported, so that the inner body is supported and axially secured in the outer body through the axial bracing. The inner body is preferably supported via radial ring collars, provided at the end face, against the axial and radial shoulder surfaces, so that an annular space is delimited in a simple manner against the annular jacket in the case of a central piece of the inner body located between the ring collars. The adjustment means, including an axially adjustable and, in particular, hydraulically actuatable, piston, designed as an annular piston, can be arranged in this annular space. The annular piston is conveniently provided with a guide bushing extending axially, which is virtually surrounded, at one end, by the annular piston, and whose radially inner and radially outer gearings engage with the corresponding gearings of the inner and outer bodies in the area that is farther away from the annular piston. These gearings are designed as helical gearings angled in opposite directions, so that the axial movement of the annular piston results in a rotation of the inner body with respect to the outer body.

In view of a goal of making operating pressures as low as possible, is desirable to make the piston surfaces as large as possible. Accordingly, the distance between the inner and outer bodies in the area of the annular piston is greater than in the area of the teeth, and the ring collar of the annular body that is next to the annular piston and delimits one of the working spaces separated by it in the front has a greater diameter than the other ring collar of the annular piston. As a result, approximately the same size of bolt ring diameter is available for bolting on the cover-forming flanges despite the same or basically the same outer diameter of the annular jacket. In particular, the available room allows the required hydraulic connections to be provided axially and to associate them with the cover that is closer to the annular piston and its working spaces.

BRIEF DESCRIPTION OF THE DRAWINGS

The present invention is elucidated in greater detail below with reference to the drawings, in which.

DETAILED DESCRIPTION

Figure 1:
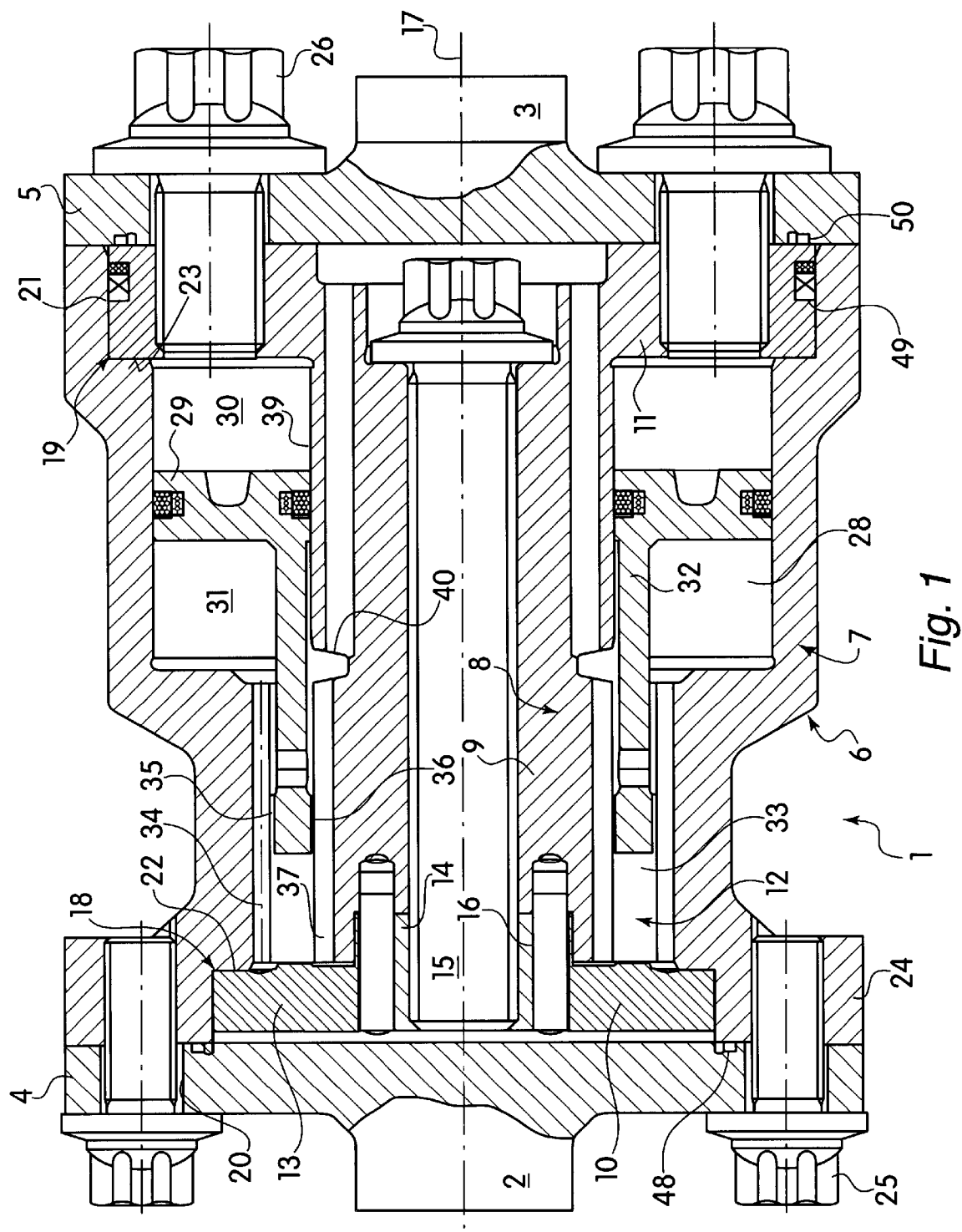
FIG. 1 shows a section through a rotary actuator according to the present invention through line I—I of FIG. 2.

Only the rotary actuator of a driving stabilizer for motor vehicles is shown in the figures, assuming that a known general arrangement exists for this device, for example, according to FIG. 1 of European Patent Application No. 0458345 A2, which is herewith incorporated by reference herein.

The rotary actuator labeled with 1 in the embodiments is located axially between spider parts 2, 3 of the driving stabilizer, preferably in the longitudinally central area of the vehicle. Spider parts 2, 3, of which only the areas of connection to the rotary actuator are shown, blend into the stabilizer arms at their ends extending along the longitudinal sides of the vehicle that are not illustrated here, and are fastened to the stabilizer arms, which extend roughly in the longitudinal direction of the vehicle and impact parts of the respective wheel suspension system of opposite wheels of an axle, which are connected by the driving stabilizer. In this embodiment, spider parts 2, 3 are connected as one piece to flanges 4, 5, which form covers at the same time, which are provided as a lateral front end of rotary actuator 1.

The operating parts of rotary actuator 1 are associated with its central part 6 located between flanges 4, 5, which serve as covers. They include an outer body 7 and an inner body 8, outer body 7 forming the axial support of flanges (covers) 4, 5 as an annular jacket. In contrast with outer body 7, which is preferably designed as one piece, in this embodiment inner body 8 is designed basically with a middle piece 9, which is provided at its ends with ring collars 10 and 11, which have a larger diameter than middle piece 9, and which axially delimit annular space 12 located between outer body 7 and middle piece 9.

Of the two ring collars 10 and 11, ring collar 10 has a smaller outer diameter than ring collar 11 and is a component of a disk 13, which is guided with respect to middle piece 9 via a guide neck 14, which axially extends into middle piece 9. Disk 13 is traversed by a central threaded hole in the area of central guide neck 14 and is fastened to central part 9 via a central fastening bolt 15. In addition to this fastening, which results in a friction-type connection, middle piece 9 is also form-fittingly connected to disk 13 in the area of guide neck 14, preferably via pins 16, so that a non-rotatable, virtually rigid connection is obtained between middle piece 9 and disk 13 with ring collar 10. At the opposite end, middle piece 9 blends into ring collar 11, according to the present invention, preferably as one piece. The radial diameter of ring collar 11 is greater than that of ring collar 10. Both ring collars 10 and 11, which axially and radially guide inner body 8 in outer body 7 coaxially to the latter—the axes of rotation of rotary actuator 1 and of spider parts 2, 3 being labeled as 17—are supported by shoulders 18, 19 of outer body 7. Shoulders 18, 19 are provided in the ends on the internal periphery of outer body 7 and form radial bearing surfaces 22, 23 and axial support surfaces 20, 21 for ring collars 10, 11. As inner body 8 is axially fastened by fastening bolt 15, it is a solidary unit vis-a-vis outer body 7. Inner body 8 does not project beyond outer body 7 at the ends, and outer body 7 virtually forms central part 6 of the rotary actuator housing.

Of flanges (covers) 4 and 5, flange 4, which is associated with the front of rotary actuator 1 that is in contact with ring collar 10 having the smaller diameter, is bolted to central part 6 of the housing against a radial flange connection 24 of central part 6, which extends radially outward, shoulder 18 being located radially inward. In the embodiment, the bolt connection is implemented using four fastening bolts 25, bolts 25 creating a friction connection between the cover formed by flange 4 and central part 6.

On the other end face of rotary actuator 1, which is associated with the ring collar 11 having the larger diameter, this ring collar forms the support surface for flange 5, serving as a cover, with a friction connection being established between flange 5 and the adjacent end face of ring collar 11 via fastening bolts 26. The threaded holes for fastening bolts 26 are provided in ring collar 11 are denoted with 27 in FIG. 1.

Annular space 12 between outer body 7 and inner body 8 has different widths along its axial length, annular space part 28 having a larger width being provided adjacent to ring collar 11. An annular piston 29 with seals 53 is arranged axially movably in annular space part 28, dividing annular space part 28 into two working chambers 30 and 31. Radially inward, on its side facing ring collar 10, annular piston 29 has a bushing 32 as a neck-shaped extension, which protrudes into an annular space part 33, which has a smaller width than annular space part 28 and constitutes an axial extension of the latter. The outer diameter of inner body 8 in the area of its middle piece 9 corresponds, over the length of middle piece 9, to the inner diameter of piston 29 and bushing 32, and outer body 7 is drawn inward in the area corresponding to annular space part 33 having a smaller width.

Bushing 32 is provided, in its end area (not illustrated in detail) distant from annular piston 29, with helical gearing radially inside and radially outside in an essentially known manner. These gearings are angled in opposite directions and each is engaged with a counter-gearing associated with outer body 7 and inner body 8, respectively. The respective gearings are labeled in FIG. 1 with 34 for outer body 7, with 35 for the outer periphery of bushing 32, with 36 for the inner periphery of the bushing, and with 37 for the outer periphery of inner body 8.

Gearing 37 is axially offset with respect to guide surface 39 provided on inner body 8 for piston 29 by a flute 40 provided in the outer periphery of inner body 8. Flute 40 is positioned approximately at the height of the side of annular space part 28 facing away from ring collar 11.

Figure 3:
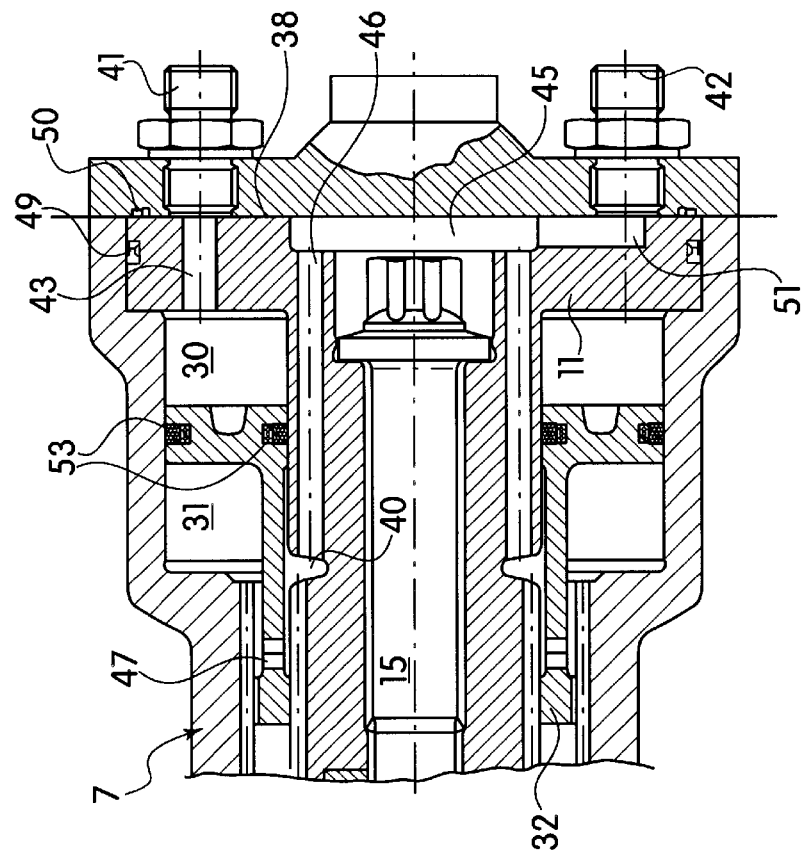
FIG. 3 shows a section of the right-hand side end area of the rotary actuator of FIG. 1 through line II—II of FIG. 2.
Figure 2:
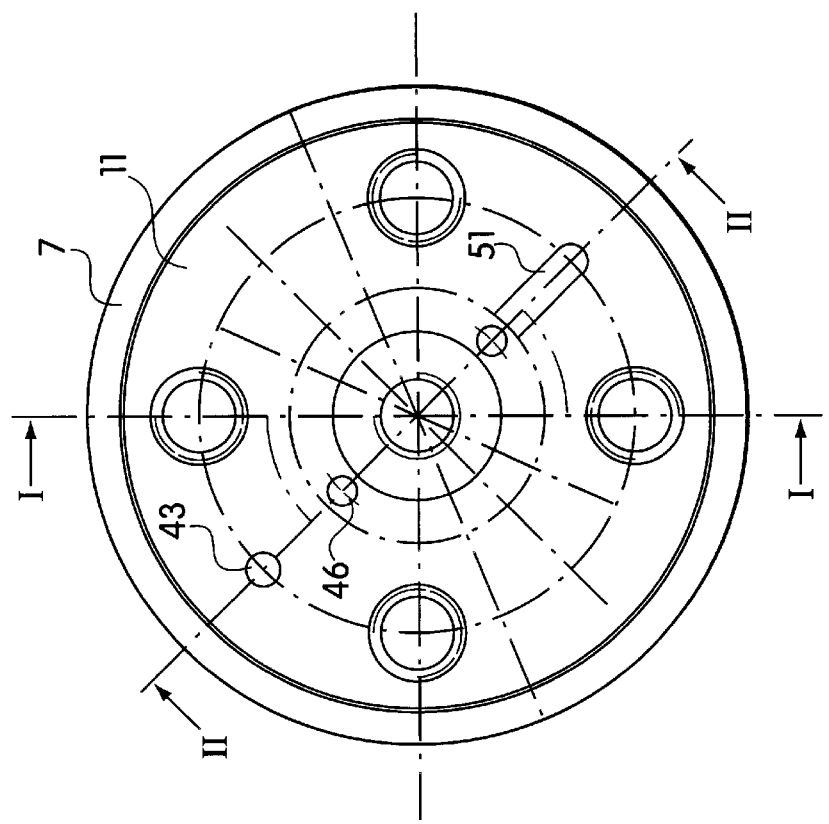
FIG. 2 shows a simplified elevational view of the rotary actuator of FIG. 1.

Annular piston 29 receives pressure, in particular, hydraulic pressure, via the supply of a pressure medium to working chambers 30 and 31, as shown in FIG. 3 in conjunction with FIG. 2, through axial fittings 41, 42, associated with the front face of the cover, formed by flange 5, adjacent to ring collar 11. Working chamber 30, adjacent to ring collar 11, is directly supplied via fitting 41 and orifice 43 in ring collar 11, while working chamber 31 is connected to fitting 42. This connection runs basically within inner body 8, a distribution chamber 45, closed by flange 5 as a cover and provided in ring collar 11, being provided centrally around head space 44 of fastening bolt 15. Distribution holes 46 go from distribution chamber 45 to flute 40, which is covered by the inner periphery of bushing 32 with a radial gap between them. Furthermore, at least one radial hole 47 is provided in bushing 32 in the transition region located upstream from gearings 35 and 36. The pressure medium exits through this radial hole 47 to the area of bushing 32 offset radially inward with respect to gearing 34 of outer body 7 and thus enters annular space part 28.

Thus, with a method according to the present invention, the supply pathways are located within central part 6, so that no leakage may occur, and only a minimum amount of sealing is required. According to the present invention, flange 4 is sealed with respect to outer body 7 directly, preferably via a seal ring 48.

On the opposite side, the seal between ring collar 11 and outer body 7 is provided via the sole seal 49, according to the present invention, between movable parts.

Furthermore, a ring seal 50 is provided between flange 5 and ring collar 11, which is fixedly attached to it, so that no individual seals are needed in the area of fittings 41 and 42 if, as illustrated, fitting 41, as it blends into orifice 43, is connected to distribution chamber 45 by an approximately tight contact between flange 5 and end face 38 of ring collar 11.

In particular, FIGS. 2 and 3 show that fitting 42 is connected to distribution chamber 45 via a branch channel 51, which is machined into end face 38 of ring collar 11 associated with flange 5.

Building on the principle described in, for example, European Patent Application 0428439 No. A1, a rotary actuator having compact dimensions and very advantageous assembly characteristics is provided. By using connecting flanges 4 and 5 of spider parts 2 and 3 as covers, further simplification and a particularly compact and short design are achieved. Furthermore, a method according to the present invention is characterized by the fact that only internal oil channels are provided, resulting in a very advantageous construction also from the point of view of sealing. This also allows axial connections, which is particularly advantageous due to the space constraints in vehicles.

The associated control devices for supplying pressure medium into the working chambers are not illustrated in detail, but they can be formed by distributing valves. In a preferred embodiment, a 3/2-way valve, in particular a proportional valve, is provided, so that any position, including, in particular, a mid-position, can be set. In the mid-position, the fittings can be closed, so that the rotary actuator acts as a solid connecting piece between the spider parts connected to it.

Furthermore, the mid-position can also be set as a floating position, so that the spider parts are freely movable with respect to one another. Thus, programmable or freely selectable chassis effects that can be influenced by a drive stabilizer can be used, depending on predefined driving programs, as predefined or freely selectable effects.

In this context, it can also be advantageous according to the present invention if the gearings are designed so that a self-blocking effect is obtained, i.e., the spider parts cannot rotate with respect to one another unless the adjustment piston is actively acted upon.

By combining the working parts of the rotary actuator into a central part 6 that can be radially inserted between flange parts 4, 5, very advantageous conditions for any maintenance or repair work are obtained.

What is claimed is:

1. A drive stabilizer for motor vehicles comprising:
   lateral, swivelable stabilizer arms;
   first and second spider parts disposed in transverse connections of the stabilizer arms; and
   a rotary actuator connecting the first and second spider parts, the rotary actuator being disposed between the first and second spider parts and being coaxial with the first and second spider parts, the rotary actuator including:
   first and second end face connecting flanges formed at respective ends of the first and second spider parts; and
   a central part adjacent to the first and second end face connecting flanges and including an outer body formed by an annular jacket spanning a gap between the first and second end face connecting flanges and an inner body, the outer body and inner body being mutually rotatable and axially secured with respect to one another and each non-rotatably connected to a respective one of the first and second spider parts via a respective one of the first and second end face connecting flanges, the first and second end face connecting flanges forming covers for the central part.

2. The drive stabilizer as recited in claim 1 wherein the first and second end face connecting flanges are non-detachably connected to the first and second spider parts.

3. The drive stabilizer as recited in claim 2 wherein the first and second end face connecting flanges are each one piece with the respective first and second spider part.

4. The drive stabilizer as recited in claim 1 wherein the outer body forms a housing of the central part.

5. The drive stabilizer as recited in claim 1 wherein the outer body provides axial and radial support for the inner body and the inner body is non-rotatably connected to the respective one of the first and second end face connecting flanges.

6. The drive stabilizer as recited in claim 1 wherein an end face of the outer body and an end face of the inner body are almost flush with each other.

7. The drive stabilizer according to claim 1 wherein the outer body includes axially offset shoulders disposed on a radially inward side, the inner body being axially supported against the axially offset shoulders.

8. The drive stabilizer as recited in claim 7 wherein the inner body is disposed on axial annular surfaces of the shoulders.

9. The drive stabilizer as recited in claim 8 further comprising front face radial ring collars for supporting the inner body against the axial annular surfaces and against radial surfaces of the shoulders.

10. The drive stabilizer as recited in claim 9 wherein the inner body delimits an annular space with respect to the outer body between the ring collars, and further comprising an adjusting device disposed in the annular space.

11. The drive stabilizer as recited in claim 10 wherein the adjusting device includes an axially adjustable piston.

12. The drive stabilizer as recited in claim 10 wherein the adjusting device includes an axially adjustable annular piston provided with an axially extending bushing.

13. The drive stabilizer as recited in claim 12 wherein the bushing is surrounded at one end by the piston.

14. The drive stabilizer as recited in claim 12 wherein the inner body including a first counter-gearing and the outer body including a second counter-gearing and the bushing includes a first helical gear disposed on a radially inward side and an a second helical gear disposed on a radially outward side, the first helical gear being angled in an direction opposite the second helical gear, the first helical gear meshing with the first counter-gearing and the second helical gear meshing with the second counter-gearing.

15. The drive stabilizer as recited in claim 11 wherein the piston is capable of being pressurized on either of a first and a second side.

16. The drive stabilizer as recited in claim 11 wherein the piston is capable of being hydraulically pressurized.

17. The drive stabilizer according to claim 12 wherein the annular space includes a working chamber, the inner body includes a flute in an outer periphery, and the bushing includes gear teeth disposed on a free end area, and wherein in another area of the bushing extending along the piston adjacent to the free end area, the bushing delimits oil channels against the inner body and the outer body, the oil channels opening into the working chamber and the flute.

18. The drive stabilizer as recited in claim 1 wherein the central part is an assembly unit.

* * * * *